US 8,694,522 B1

(12) United States Patent
Pance

(10) Patent No.: US 8,694,522 B1
(45) Date of Patent: Apr. 8, 2014

(54) CONTEXT DEPENDENT RECOGNITION

(75) Inventor: Aleksander Pance, Saratoga, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/432,274

(22) Filed: Mar. 28, 2012

(51) Int. Cl.
G06F 7/00 (2006.01)
G06F 17/30 (2006.01)

(52) U.S. Cl.
USPC ........... 707/758; 707/706; 707/913; 707/914; 707/915; 707/916

(58) Field of Classification Search
USPC .................. 707/706, 758, 913, 914, 915, 916
See application file for complete search history.

(56) References Cited

U.S. PATENT DOCUMENTS

| | | | | |
|---|---|---|---|---|
| 8,036,878 | B2 * | 10/2011 | Assadollahi | 704/10 |
| 2006/0017562 | A1 * | 1/2006 | Bachelder | 340/531 |
| 2006/0103940 | A1 * | 5/2006 | Lo et al. | 359/619 |
| 2007/0074131 | A1 * | 3/2007 | Assadollahi | 715/816 |
| 2009/0044128 | A1 * | 2/2009 | Baumgarten et al. | 715/738 |
| 2009/0103899 | A1 * | 4/2009 | Lessing | 386/120 |
| 2009/0141129 | A1 * | 6/2009 | Dischinger | 348/158 |
| 2009/0240735 | A1 * | 9/2009 | Grandhi et al. | 707/104.1 |
| 2010/0131089 | A1 * | 5/2010 | Anderson et al. | 700/94 |
| 2011/0010629 | A1 * | 1/2011 | Castro et al. | 715/732 |
| 2011/0197128 | A1 * | 8/2011 | Assadollahi | 715/259 |
| 2013/0083999 | A1 * | 4/2013 | Bhardwaj et al. | 382/165 |
| 2013/0085893 | A1 * | 4/2013 | Bhardwaj et al. | 705/26.62 |

* cited by examiner

*Primary Examiner* — Phong Nguyen
(74) *Attorney, Agent, or Firm* — Novak Druce Connolly Bove + Quigg LLP

(57) ABSTRACT

Context data can be used to determine the current context and/or to predict the future context of a user. When the disclosed technology knows of the user's likely context, it can prepare for object recognition (e.g., image recognition, speech recognition, etc.) by (downloading and) locally storing (i.e., holding) object data related to the context. This allows for the object recognition to be performed locally and for any additional information about the object to be provided without communication over a network, thereby reducing resources such as time, cost, and processing power. If, however, the object data related to the context is not available locally, such object data can still be downloaded from a server/cloud. In some embodiments, if a likely future context is predicted and the object data related to that future context is not available locally, the object data can be downloaded from a server/cloud prior to the future context.

18 Claims, 7 Drawing Sheets

CONTEXT DEPENDENT RECOGNITION

BACKGROUND

Users are increasingly utilizing electronic devices to obtain various types of information. For example, a user wanting to learn the name of a song playing in the background can cause a sample of that song to be recorded by an electronic device and uploaded to a song identification service for analysis. Likewise, a user wanting an answer to a question can use his voice to ask his device the question, such that the device will process the user's voice and retrieve the answer to the question. In a similar fashion, a user wanting to determine the availability of a book can capture an image of the book and upload that image to a book identification service for analysis. Such approaches have potential downsides, however, as they require an active connection to an appropriate service in order to transfer the information for analysis, as well as to receive the result of the analysis. If no data connection is available, the user might be able to wait until a later time when a connection is available, but cannot obtain results when the user most likely wants those results. Even when a connection is available, the amount of time necessary to upload an image or audio file and obtain the results can be undesirable for many users, particularly when using relatively slow connections such as cellular data connections. Further still, even when a connection is available, the vast amount of information needed to be sifted through in order to obtain the results can require a great deal of time and processing power.

BRIEF DESCRIPTION OF THE DRAWINGS

Various embodiments in accordance with the present disclosure will be described with reference to the drawings, in which.

DETAILED DESCRIPTION

Figure 1:
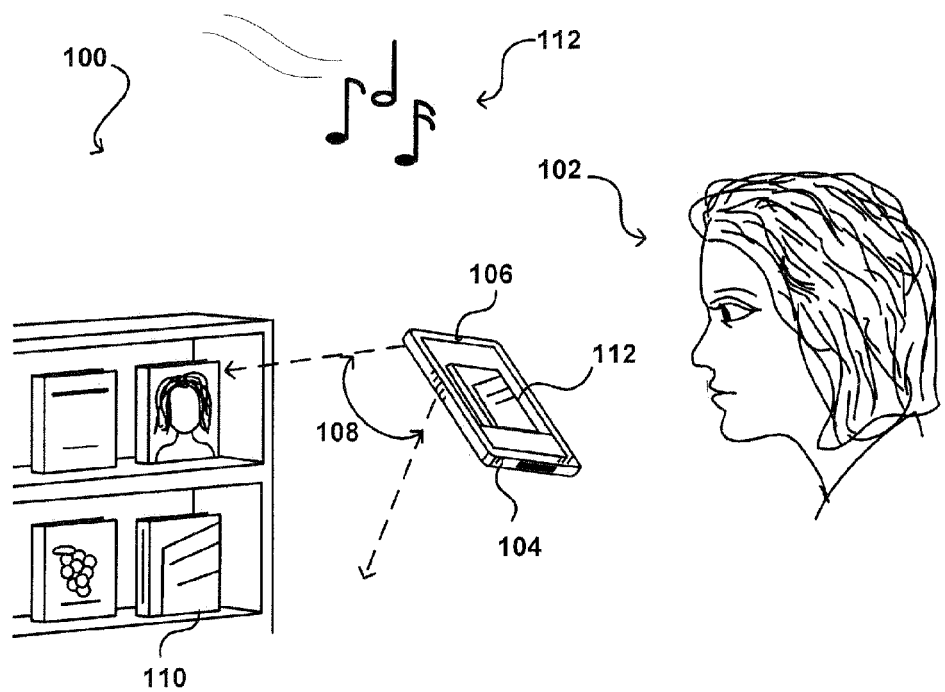
FIG. 1 illustrates an example environment in which aspects of the various embodiments can be that can be utilized.

Systems and methods in accordance with various embodiments of the present disclosure overcome one or more of the above-referenced and other deficiencies in conventional approaches to identifying various types of elements or content using an electronic device. In particular, various embodiments attempt to determine a current or future context of a user and/or electronic device based on information such as the current location and/or context of the device. Information about the current location and/or context can be used to assist in identifying objects in images, recognizing speech (i.e., speech objects), and other such tasks.

In at least some embodiments, a computing device can attempt to determine information about a context (e.g., current location) of the device by attempting to determine information about its surroundings or environment (i.e., context information and/or data). For example, one or more algorithms executing on the device can attempt to capture image information using one or more cameras, audio information using one or more microphones, position information from a global positioning system (GPS), and other such information (i.e., context data). The context data can be captured concurrently at a single point in time, or captured over a period of time. In some embodiments, the data is analyzed by software executing on the computing device, while in other embodiments the data can be sent to a remote system or service for analysis. Data to be analyzed remotely can be sent as it is captured for a near real-time analysis, while in other embodiments data can be sent in batches or other periodic groupings. Approaches in accordance with various embodiments provide one or more algorithms to identify various types of elements or content included in the context data, such as by identifying items in the captured image data, identifying a title of a song playing as determined by captured audio information, identifying the content of speech as determined by captured audio information, determining an identity of one or more users around the device, etc. This can be done, for example, by detecting features in an image or unique frequencies in an audio stream/file and then comparing this information to a data store of matching information.

In at least some embodiments, a client device can try to approximate and determine the current context of its user (e.g., where the user is, what is the user doing, who the user is, who is the user with, etc.) using one or more sensors of the computing device. For example, a client device can use its GPS, network connection (e.g., WiFi, cellular), camera, microphone, and/or other sensors to gather data (e.g., context data) about the context and environment in which the device/user is. For example, the device can use its GPS, Wifi Received Signal Strength Indicator (RSSI), Wifi SLAM (localization and mapping via WiFi signals), and/or any other similar present technology to find its current location and determine that the device and its user are in a shopping mall. Similarly, the user can use his voice to ask his device to find a list of ingredients for a particular recipe, from which the device can recognize the spoken ingredients and determine that the user is likely at the grocery store shopping for groceries. Moreover, if a user uses the camera on the device to take a picture of a nearby landmark, the device can determine that the user is near that landmark; if the device further is able to determine that it is a holiday (e.g., via its internal system calendar) and/or that the user is with family and friends, it can conclude that the user is likely on vacation. The device can use any combination of its sensors and/or system data (e.g., internal clock, internal calendar) to determine the user's context.

In at least some embodiments, when the current context of the user can be determined, the device can locally store (e.g., hold) a subset of the data relating to objects (e.g., object data) available on a cloud/server depending on the determined context. An object can be a pattern, sight, text, image, video, sound, speech, smell, touch, taste, other senses, biological/biometric element, temperature measurement, humidity measurement, etc. For example, if the device determines that the user is in a shoe store, the device can (download and) store in its local cache a subset of the object data (i.e., data related to objects) available on the cloud/server, the subset being related to shoe shopping. If the user uses his device camera, for example, to view a pair of shoes (a visual object), the device can utilize an object recognition algorithm to find a match in the local cache, thereby reducing processing time and effort. If a match is found, the device can provide additional information about the object (the pair of shoes), such as object description, pricing, availability, ratings, consumer reviews, social networking information, and other such information. If a match cannot be found, the device can still search on the cloud/server. Similarly, if the device determines that the user is in his car, for example, the device can (download and) locally store (e.g., hold) a subset of data related to cars. If the user vocally asks the device for directions, the device can decipher the speech (an audio object) locally without communicating with the cloud/server because the device has local data related to cars, including speech recognition data related to cars (e.g., speech recognition data and/or acoustic models related to directions, maps, gas, nearby points of interest, etc.). If a match is found, the speech object can be recognized without communicating with the cloud/server. Moreover, the (downloaded and) stored local data related to cars can include the directions requested by the user, and thus no communication with cloud/server is needed to obtain those directions.

In general, object recognition algorithms (e.g., algorithms for recognizing patterns, images, videos, sounds, speech, smells, touch, taste, other sensory data, temperature, humidity, biological/biometric elements, etc.) are very complex and time consuming when applied to large collections of data. They are much faster when applied to smaller collections. The accuracy of recognition also increases when the collection of potential matching results from a search is smaller and already filtered to be more relevant.

In at least some embodiments, a client computing device can try to predict the future context of its user. For example, if the device determines its user will likely go to the mall tomorrow evening to buy shoes, it can prepare for that future context. It can download and locally store (e.g., hold) object recognition files and other data related to shoes and shoe shopping prior to that future context (e.g., predictive downloading, storing, and loading). When the user goes to the mall tomorrow evening to buy shoes, the device will have local data related to shoes and shoe shopping, including, for example, shoe pricing, shoe inventory, ratings, reviews, speech recognition data and/or acoustic models relating to shoes, pricing and availability at competitor stores, etc. If the user needs data not locally stored (e.g., held) on the device, the device can still communicate with a service on a cloud/server to retrieve data.

In at least some embodiments, information captured from the context data can be combined or otherwise used with information from an electronic marketplace, electronic yellow pages, location information service, or other digital environment. For example, a user identifying a type of element from context data might have that information used to recommend products through the electronic marketplace.

Various other functions and advantages are described and suggested below as may be provided in accordance with the various embodiments. Further information for object recognition can also be found in co-pending U.S. patent application Ser. No. 13/306,720, filed Nov. 29, 2011, and entitled "Architectures for Content Identification," which is hereby incorporated herein by reference.

FIG. 1 illustrates an example environment 100 in which aspects of the various embodiments can be implemented. In this example, a user 102 is in a store that sells books, and is interested in obtaining information about a book 110 of interest. Using an appropriate application executing on a computing device 104, the user is able to obtain an image of the book 110 by positioning the computing device such that the book is within a field of view 108 of at least one camera 106 of the computing device. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players.

In this example, a camera on the device 104 can capture image information including the book 110 of interest, and at least a portion of the image can be displayed on a display screen 112 of the computing device. At least a portion of the image information can be analyzed and, upon a match being located, identifying information can be displayed back to the user via the display screen 112 of the computing device 104. At the same time, a microphone (not shown) of the device might capture audio data including a portion of a song 112 playing in the bookstore at the time the image of the book was captured. The portion of the image to be analyzed can be indicated manually, such as by a user pointing to the book on the screen or drawing a bounding box around the book. In other embodiments, one or more image analysis algorithms can attempt to locate one or more elements in a context to be analyzed. In some embodiments, a user can manually cause image information to be analyzed, while in other embodiments the image information can be analyzed automatically, either on the device or by streaming context data to a remote system or service as discussed later herein.

Figure 2:
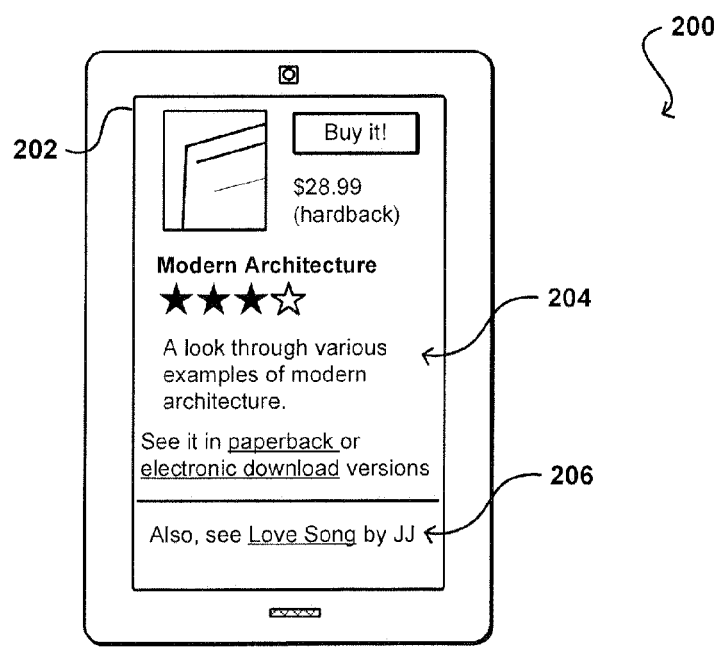
FIG. 2 illustrates an example display that can be presented in accordance with various embodiments.

FIG. 2 illustrates an example of a type of information 204 that could be displayed to the user via a display screen 202 of a computing device 200 in accordance with various embodiments. In this example, the image captured by the user has been analyzed and related information 204 is displayed on the screen. The "related" information as discussed elsewhere herein can include any information related to an object, item, product, or other element that is matched (within at least a level of confidence) to the context data using one or more matching or identifying algorithms, or other such approaches. These can include, for example, image recognition algorithms, feature recognition algorithms, facial recognition algorithms, audio pattern recognition algorithms, or any other such approaches or techniques. The displayed information in this example includes the title of the located book, an image of the book (as captured by the user or otherwise obtained), pricing and description information, and review information. Also as shown are options to purchase the book, as well as options for various other versions or forms of that content, such as a paperback book or digital download. In addition, a second result 206 might be shown that enables the user to obtain information about the song that was playing in the bookstore at the time. Further, the type of information displayed (or otherwise conveyed) can depend at least in part upon the type of content located or matched. For example, a located song might include artist and title information, as well as audio formats in which the song is available. For facial recognition, the information might include name, title, and contact information. Various other types of information can be displayed as well within the scope of the various embodiments.

Figure 3:
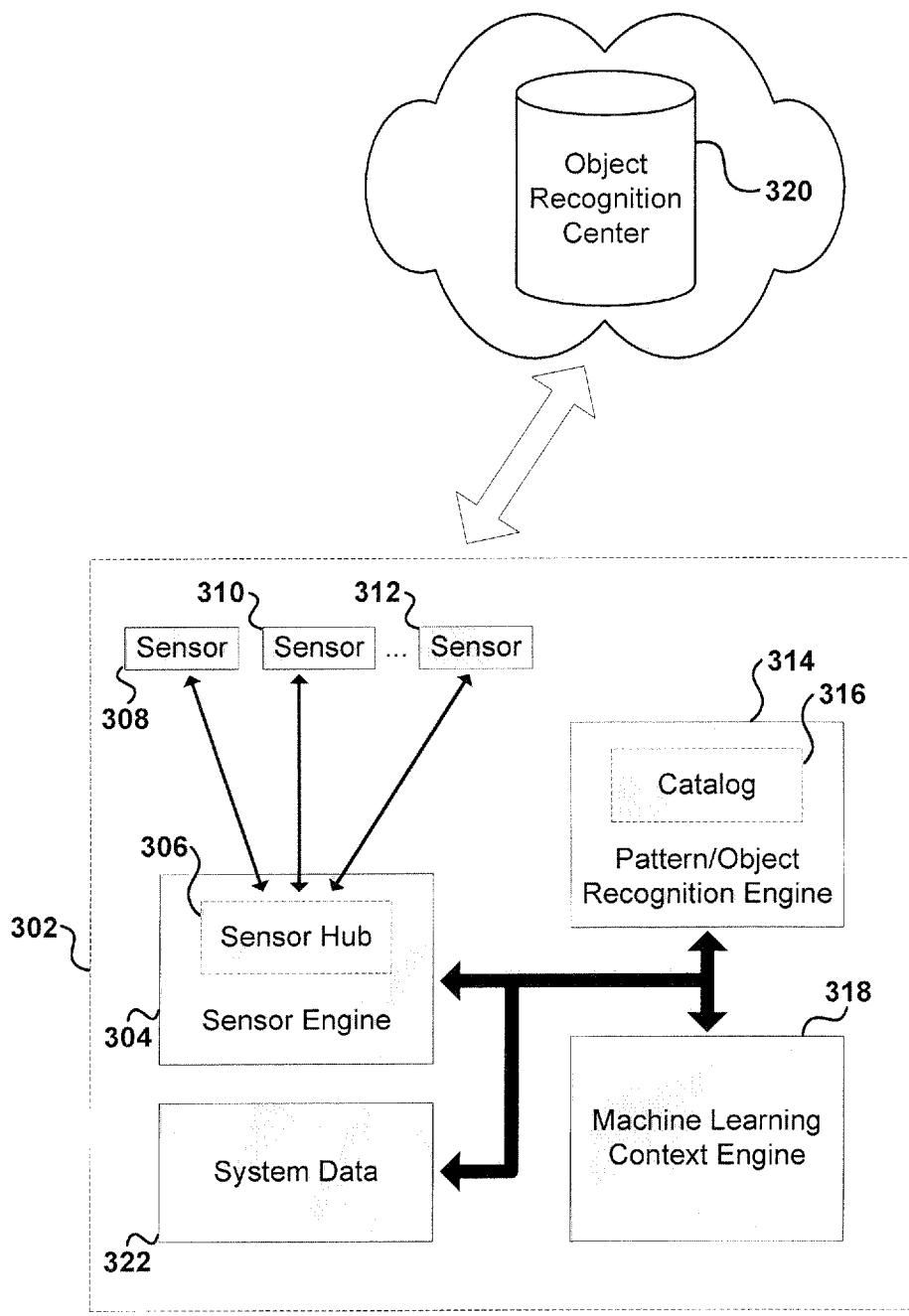
FIG. 3 illustrates an example system embodiment for context dependent recognition and matching.

As discussed, information such as that illustrated in FIG. 2 can be located by streaming (or otherwise transferring) an image, audio clip, and/or other electronic data to a system or service operable to find one or more potential matches for that data and provide related information for those potential matches. FIG. 3 illustrates an example system embodiment 300 for context dependent recognition and matching. The system embodiment 300 comprises a sensor engine 304, a sensor hub 306, at least one sensor (e.g., 308, 310, 312), a pattern recognition engine 314, a catalog 316, a machine learning context engine 318, and an object recognition center 320. The sensor engine 304 can communicate with the sensor hub 306 to collect data from at least one sensor (e.g., 308, 310, 312) in the device. The sensor hub 306 can be integrated with, or separate from, the sensor engine 304. The sensor hub 306 in this example can obtain data (e.g., context data) from the at least one sensor (e.g., 308, 310, 312). In some embodiments, the at least one sensor (e.g., 308, 310, 312) can sense data relating to location, motion, acceleration, orientation, pressure, imaging, ambient light, infrared light, sound, proximity, etc. These sensed data can be context data to be received by the sensor hub 306 and the sensor engine 304.

The data from the at least one sensor (e.g., 308, 310, 312) can be used by the machine learning context engine 318 to determine the likely context of the user. For example, the machine learning context engine 318 can receive context data such as location input from a GPS sensor to determine that the user is at, or near, a park. The machine learning context engine 318 can also use additional context data such as imaging input (e.g., picture, video) from an imaging sensor (e.g., camera, facial recognition software) to determine that the user's context is with his family at the park. Further, the context engine 318 can use sound data (e.g., music, voice, speech, background noise) from an audio sensor to determine that the context is with friends at a concert. Moreover, the machine learning context engine 318 can utilize system data 322 as well, such as an internal clock, calendar, apps, reminders, notes, tasks, user activities (e.g., user preferences, messages, user interactions, etc.), and other such input. For example, if the user had noted on the internal calendar that he had a baseball game event at this time, then the machine learning context engine 318 can further determine that there is a good likelihood that the user is watching baseball with his family at the park. In some embodiments, the machine learning context engine 318 can also track the user's history and previous contexts, to determine current context and/or predict future context. In some embodiments, the context engine 318 can be adaptive, learn over time, and determine/predict contexts more quickly and accurately. Once the user's context is determined or predicted, the system can prepare for context dependent recognition.

In some embodiments, the context engine 318 can be hardware assisted. In some embodiments, the context engine 318 can use machine learning algorithms, pattern recognition and classification, to refine upon a standard set of user contexts both in breadth (i.e., new contexts for this specific user, e.g., "in the classroom," "in the office," etc.), as well as in depth (i.e., "shopping for brand ABC sports shoes at XYZ Mall," "in a sales meeting with the boss in the conference room at work," etc.).

The user triggers context dependent recognition when he submits an identification inquiry. The pattern recognition engine 314 can process such identification inquiries. In some embodiments, when a user submits an identification inquiry request, the pattern recognition engine 314 can search a collection of objects in the relevant catalog 316 to find a match for the identification inquiry. The catalog 316 can locally store data relating to objects; the object data can be categorized as belonging to one or more particular contexts. The catalog 316 can store a predetermined collection of object data and/or it can store object data downloaded from the object recognition center 320. If the pattern recognition engine 314 does not find a match for the inquiry in the catalog 316, the engine 314 can search in the objection recognition center 320. Object recognition can thus be dynamic and adaptive. In some embodiments, the pattern recognition engine 314 can be an object recognition engine.

In some embodiments, the catalog 316 (i.e., the object data stored within) can be customized and tailored to the activities, habits, routines, etc. of the user. Over time, the catalog 316 can store more appropriate and relevant object data. The catalog 316 can be adjusted such that the least accessed or least likely to be accessed object data are replace with more relevant and more likely to be accessed object data. In some embodiments, the catalog 316 is a hardware assisted small catalog embedded in the pattern recognition engine 314. In some embodiments, the catalog 316 can communicate with but is separate from the pattern recognition engine 314.

The pattern/object recognition engine 314 can search for and recognize visualizations, such as images, sight, and light. The engine 314 can also be a small vocabulary embedded speech processing engine; in other words, the engine 314 can search for and recognize speech. Further, the engine 314 can search for and recognize visuals and sounds, such as video, other inputs (e.g., text), or any combination of such inputs. In some embodiments, the pattern/object recognition engine 314 can also be a hardware assisted.

The object recognition center 320 can host object data to be accessed and/or downloaded. For example, object data can be requested, accessed, and downloaded from the center 320 to the catalog 316. The object recognition center 320 can also provide processing power for an identification inquiry. For example, if a match for an identification inquiry is not found in the local catalog 316, then the search can continue and be processed on the center 320. In some embodiments, the center 320 can also use context data (e.g., to filter out the irrelevant object data) in order to process the search for an identification inquiry more efficiently. In some embodiments, the object recognition center 320 resides on a server and/or cloud on a network. The network can be any appropriate network, such as the Internet, a local area network (LAN), a cellular network, and the like. In some embodiments, the center 320 can be a cloud and/or server based modularized object recognition center. The center 320 can also be a visual, audio, and/or speech, etc. processing control center.

It should be understood that the advantages of using local object recognition data, as opposed to complete cloud-based recognition, include faster response times, as well as autonomous operation when the cloud/network service is intermittent or not available. To that extent, having a local cache of both recent and/or most used object recognition data can minimize interaction with the cloud/network and reduce communication costs. However, it is also fully contemplated that, in some embodiments, the context engine 318 can assist the object recognition center 320 on the cloud/server only.

Moreover, in some embodiments, a computing device 302 comprises the sensor engine 304, the sensor hub 306, the at least one sensor (e.g., 308, 310, 312), the pattern/object recognition engine 314, the catalog 316, and the machine learning context engine 318. The device 302 can communicate with the object recognition center 320 to access data on the center 320 when needed.

In some embodiments, the disclosed technology can be applied to speech recognition (i.e., the objects to be recognized are speech objects such as words, phrases, sentences, and paragraphs). In some embodiments, the disclose technology can combine cloud based large-scale vocabulary speech recognition and local/embedded small-scale vocabulary speech recognition. For example, the pattern/object recognition engine 314 can be a vocabulary embedded speech processing engine, the catalog 316 can store speech recognition data, and the objection recognition center 320 can be a speech processing control center.

In some embodiments, there can be a plurality of different speech engines/catalogs loaded and the most likely to be used activated depending on context. For example, if a user is typically working at an office and frequently driving in his/her car, there can be at least two speech engines and catalogs loaded. One speech engine and catalog can be loaded for the office, which can contain speech data related to the office (e.g., how to recognize phrases such as "remind me to," "check email," "make an appointment," "take a note," etc.). This speech engine and catalog can be activated while the user is in the office. There can be also another speech engine and catalog loaded for driving. The speech catalog can contain speech data related to driving such as (e.g., how to recognize phrases such as "directions to," "go home," "find a gas station," etc.). This speech engine and catalog can be activated when the user enters his/her car.

In some embodiments, there can be a language model and an acoustic model. The language model can be associated with a particular user, whereas the acoustic model can represent a particular context. This way, a specific language model can be used for a certain user while a specific acoustic model can be used for a certain context. Different acoustic models can be applied to a user's language model depending on his/her context. For example, a sentence spoken in a bathroom can sound different from one spoken in the living room even if the same person is speaking the same sentence. In this case, having an acoustic model for the bathroom and another acoustic model for the living room can be useful. Having customized language models and customized acoustic models can eliminate background noise, buffer the speaker's voice, etc., and improve the quality of speech recognition.

Referring back to FIG. 3, when a match is found for an identification inquiry from the catalog 316 or center 320, a response (e.g., data relating to the subject of the inquiry) can be transmitted to the user. In some embodiments, identification inquiries can be automatically initiated (e.g., initiated proactively by the user device). In some embodiments, a user can initiate the identification inquiry. Continuing with a previous example, the user watching baseball at the park with his family can inquire about the baseball game. The user initiates an identification inquiry by asking a question regarding a certain baseball player's statistics this season. The question voiced by the user can be received by the system embodiment 300 as an audio file. Since the system has already determined the user context (at the park attending a baseball game with the family), data such as voice recognition data and factual information relating to this context can be (downloaded and) stored in the local catalog 316. Voice recognition data relating to this context can include, for example, how to recognize the names of baseball players, how to recognize certain words related to baseball, etc. Other data relating to this context can include team/player statistics, scores, rankings, game rules, etc. Referring back to the identification inquiry (the question asked by the user), the system searches for potential matches in the catalog 316 and finds them (i.e., the catalog 316 contains data regarding how to vocally recognize the particular words in the question). The system can then understand the question and use the factual information relating to baseball in the catalog 316 to respond. If, however, the system cannot find a match in the local catalog 316, it can communicate with the object recognition center 320 to process the inquiry and provide a response. Likewise, an identification inquiry associated with a picture, video, etc. can be performed in a similar fashion. For example, if the user takes a picture of a certain baseball player, the system can process the picture and respond by providing additional information about the player (e.g., age, height, weight, batting average, etc.).

Figure 4:
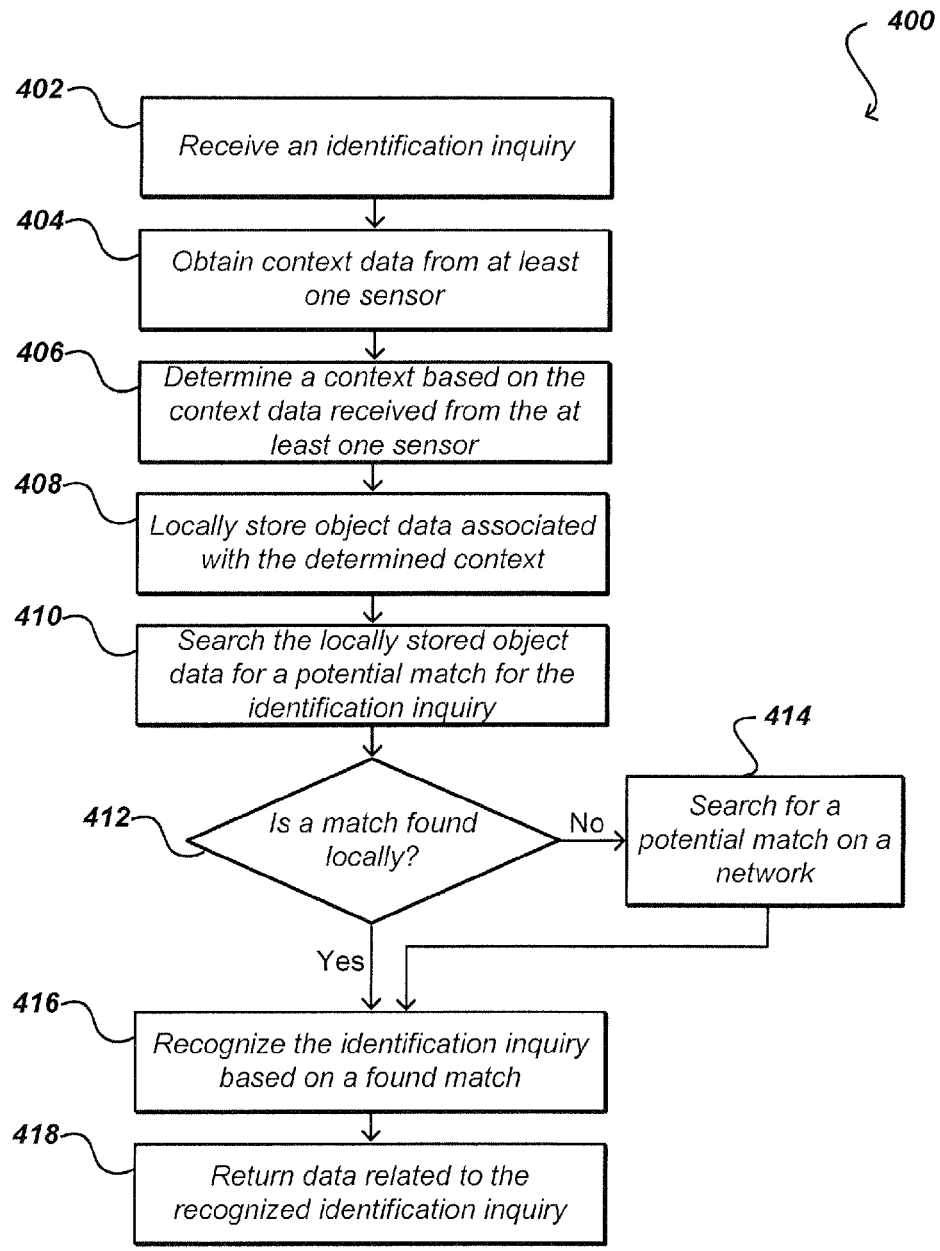
FIG. 4 illustrates an example method embodiment for context dependent recognition.

FIG. 4 illustrates a method 400 for context dependent recognition in accordance with one embodiment. It should be understood that there can be additional, fewer, or alternative steps performed in similar or alternative orders, or in parallel, within the scope of the various embodiments unless otherwise stated. In this example, an identification inquiry is received 402. For example, an identification inquiry can be a particular question asked by a user in the form of an audio clip. Another example can be a picture of an item in the form of an image file. In some embodiments, identification inquiries (e.g., pictures, videos, sounds) can be automatically initiated (and received) at certain times (e.g., at a scheduled time, at set time intervals). At step 404, context data can be obtained from at least one sensor. As stated previously, context data can include data relating to location, motion, acceleration, orientation, pressure, imaging, ambient light, sound, proximity, etc.

A context can be determined 406 based on the context data obtained. For example, if the context data obtained contains information telling of fast acceleration, the context can be determined with a high degree of success to be "in a moving vehicle." Moreover, there can be context data in the form of visuals of nearby points of interest or surrounding vehicles such that the context can be determined to be "in a moving vehicle on Highway 123." At step 408, the appropriate/relevant object data associated with the determined context can be (downloaded, loaded, and) stored locally. The locally stored object data can be searched 410 to find a potential match for the identification inquiry. If a match is found at step 412, then the method embodiment proceeds to step 416. If a match is not found, then the search for a potential match continues 414 on a network (e.g., on a server/cloud on the network). When a match is found, the identification inquiry can be recognized 416 (e.g., the inquiry is "understood" by the disclosed technology). For example, a match can be found for a speech clip, thereby allowing the disclosed technology to decipher the meaning of the speech. Another example is when an image is matched such that the disclosed technology recognizes the subject(s) in the image. Upon recognizing the inquiry, a response can be provided, including returning data related to the inquiry 418.

In a particular example, the context of a user is determined to be "driving a car." The user can have a computing device set to automatically initiate (and receive) identification inquiries at certain times (e.g., every second). The device can use its camera to sense visual images of surrounding cars, specifically, any cars in front. Having determined the context to be "driving a car," object data related to "driving a car" can be stored and accessed locally. Identification inquiries in the form of visual images from the camera are initiated and received by the device every second. Based on the local object data related to "driving a car," it can be recognized in the visual image whether or not there is a car in front. Moreover, the distance to a car in front can be estimated based on the size of the car in the image. Using the distance and time interval (e.g., one second), the approximate acceleration and deceleration of a car in front can also be calculated. When a car in front suddenly decelerates quickly, the user can be warned.

Continuing with the example above, the computing device can also monitor the gas tank level of the car, for example, by communicating with an onboard car computer. Automatic identification inquires in the form of visual images of nearby points of interest can be received at set intervals (e.g., every three seconds, every mile). Any approaching gas stations in the images can be recognized, such that when the car is low on fuel, the user can be notified of any approaching gas stations.

In another example, the context of a user can be determined 406, for example, to be "in math class," based on context data 404 from the GPS, system data such as the system calendar, clock, user activity (e.g., notes, messages), etc., or other similar sensors/inputs. The appropriate object data associated with "math class" can be (downloaded, loaded, and) stored locally 408. This object data can include speech object recognition, including how to recognize words and phrases such as "pi," "square root," "algebra," "geometry." If the user asks 402 "what is the square root of pi," then the disclosed technology can try to locally find 410 a match for the user's speech. Based on the determined context ("math class"), the disclose technology can figure out that the user likely said "pi" instead of "pie" even though the two words are phonetically identical. If a match is found locally at step 412, then the speech can be recognized and the answer provided to the user 416. If a match is not found, then the search for a potential match continues 414 on a network (e.g., on a server/cloud on the network).

Figure 5:
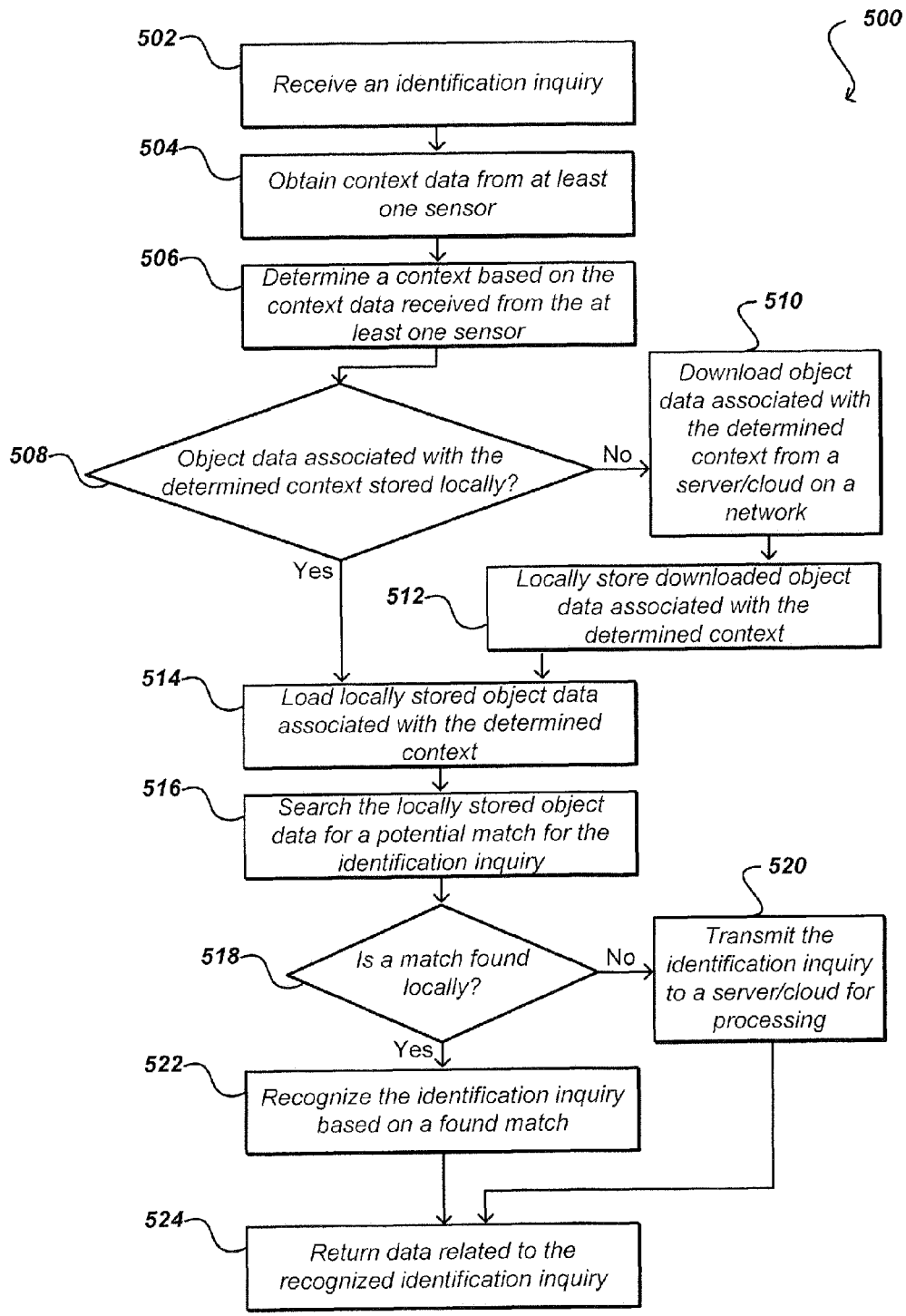
FIG. 5 illustrates an example method embodiment for context dependent recognition.

FIG. 5 illustrates method 500 of processing an identification inquiry in accordance with one embodiment. In this example, an identification inquiry is received 502. The embodiment obtains context data from at least one sensor 504. Based on the context data obtained from the at least one sensor, the context is determined 506. The method then checks 508 whether or not object data associated with the determined context is stored locally. If so, the method proceeds to step 514. If not, then object data associated with the determined context is downloaded from a server and/or cloud on a network 510 and stored locally 512. The locally stored object data associated with the determined context is loaded and made accessible 514. A search is performed through the locally stored object data to find a potential match for the identification inquiry 516. If a local match is found 518, then the method embodiment proceeds to step 522 where the identification inquiry is recognized based on the match. If not, the identification inquiry is transmitted to the server/cloud on the network to be processed there (e.g., the search is continued on the server/cloud) 520. If a match is found on the server/cloud, then the server/cloud can recognize the identification inquiry and transmit back data related to the identification inquiry. At step 522, data related to the recognized identification inquiry is returned as a response to the identification inquiry.

Figure 6:
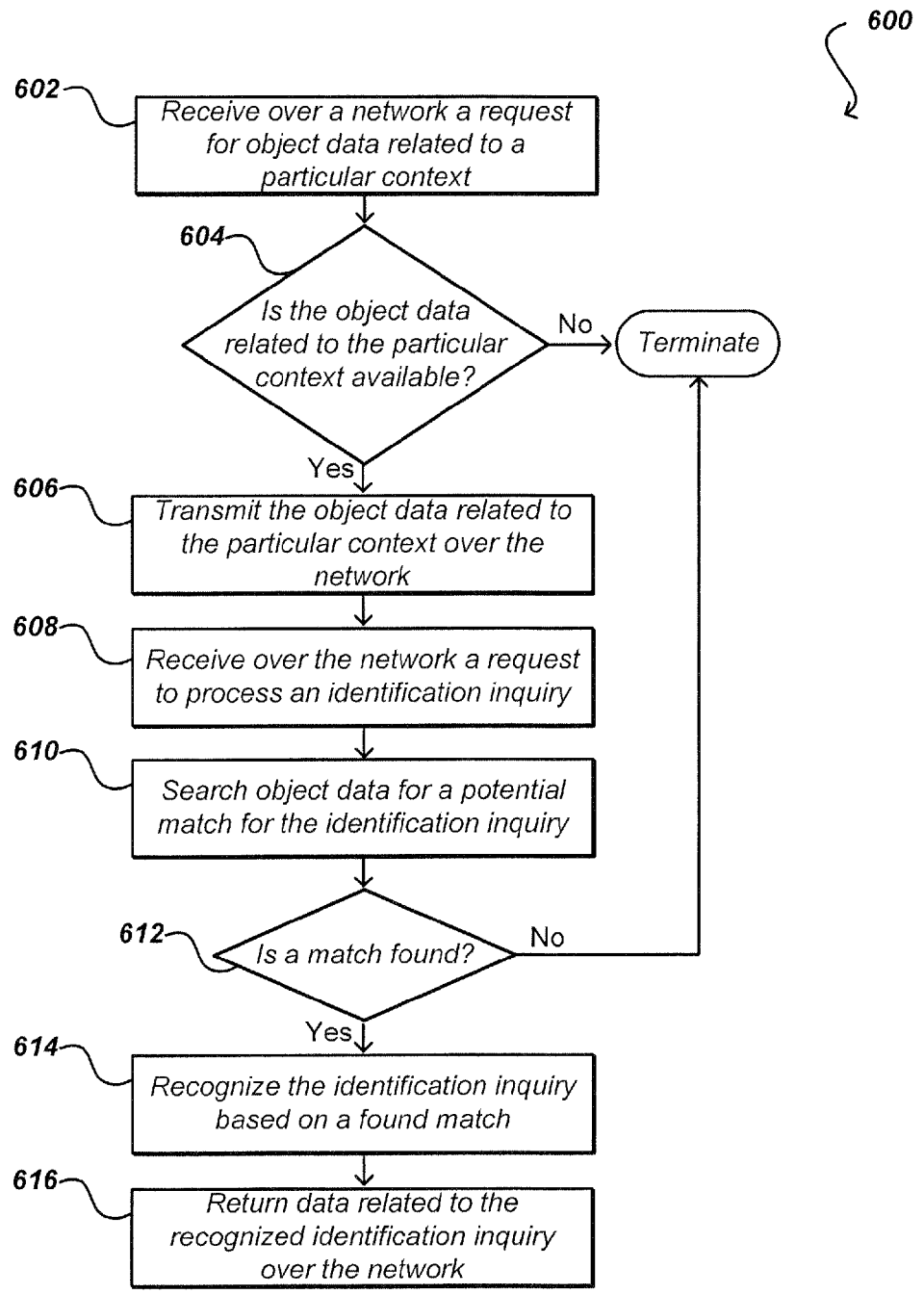
FIG. 6 illustrates an example method embodiment for context dependent recognition.

FIG. 6 illustrates an example method 600 of processing an identification inquiry in accordance with one embodiment. In this example, a request for object data related to a particular context is received over a network 602. The process checks whether or not such object data related to the particular context is available 604. If not, the method terminates. If so, the request proceeds forward and the object data related to the particular context is transmitted over the network 606 in reply to the request. Moreover, a request for an identification inquiry can be received over the network 608. The method searches through object data for a potential match for the identification inquiry 610. If a match is not found 612, the method embodiment terminates. If a match is found 612, the identification inquiry can be recognized based on the match found 614 and data relating to the recognized identification inquiry is transmitted back over the network 616.

Figure 7:
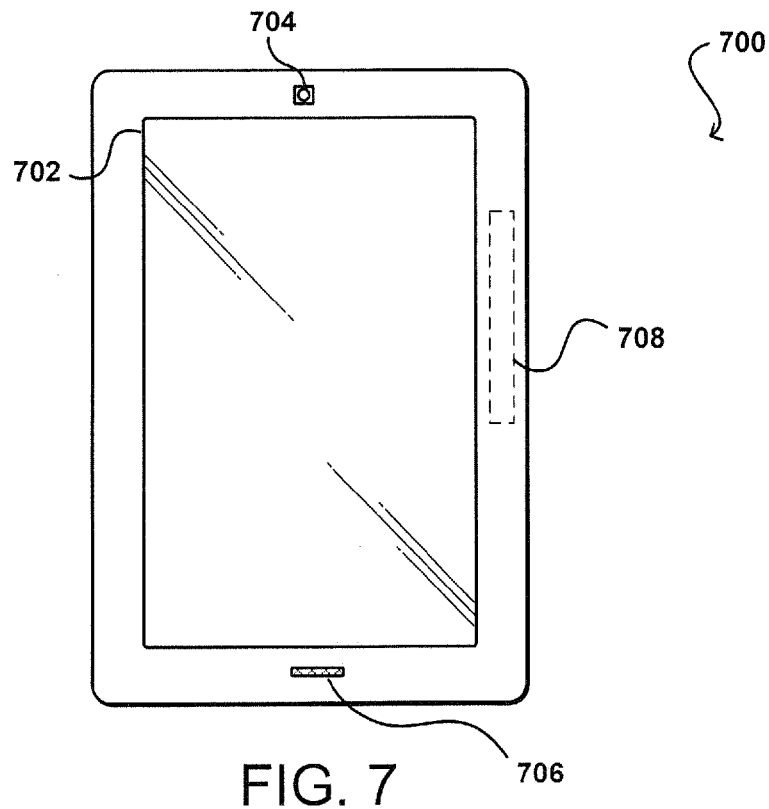
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
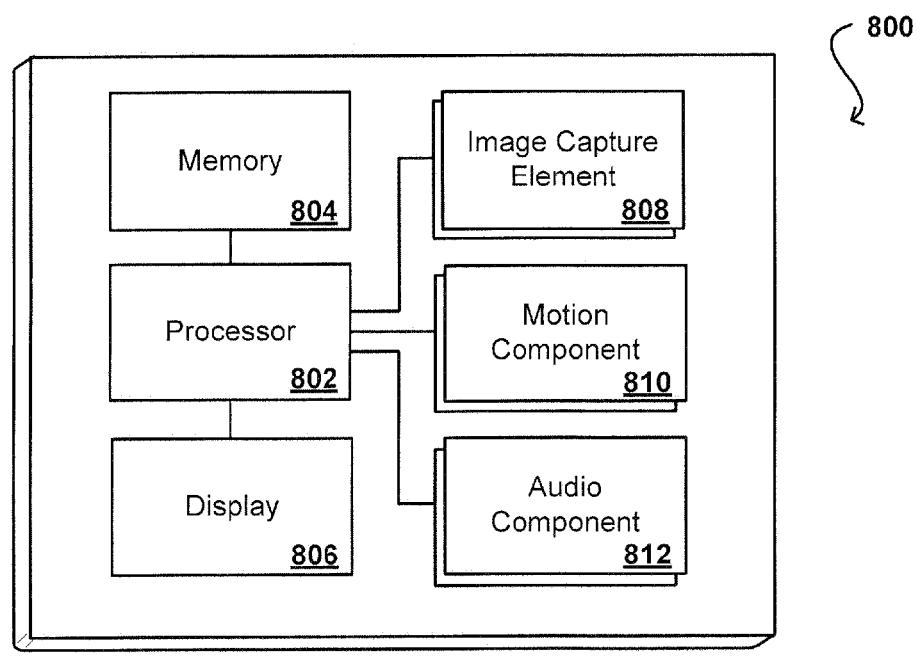
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
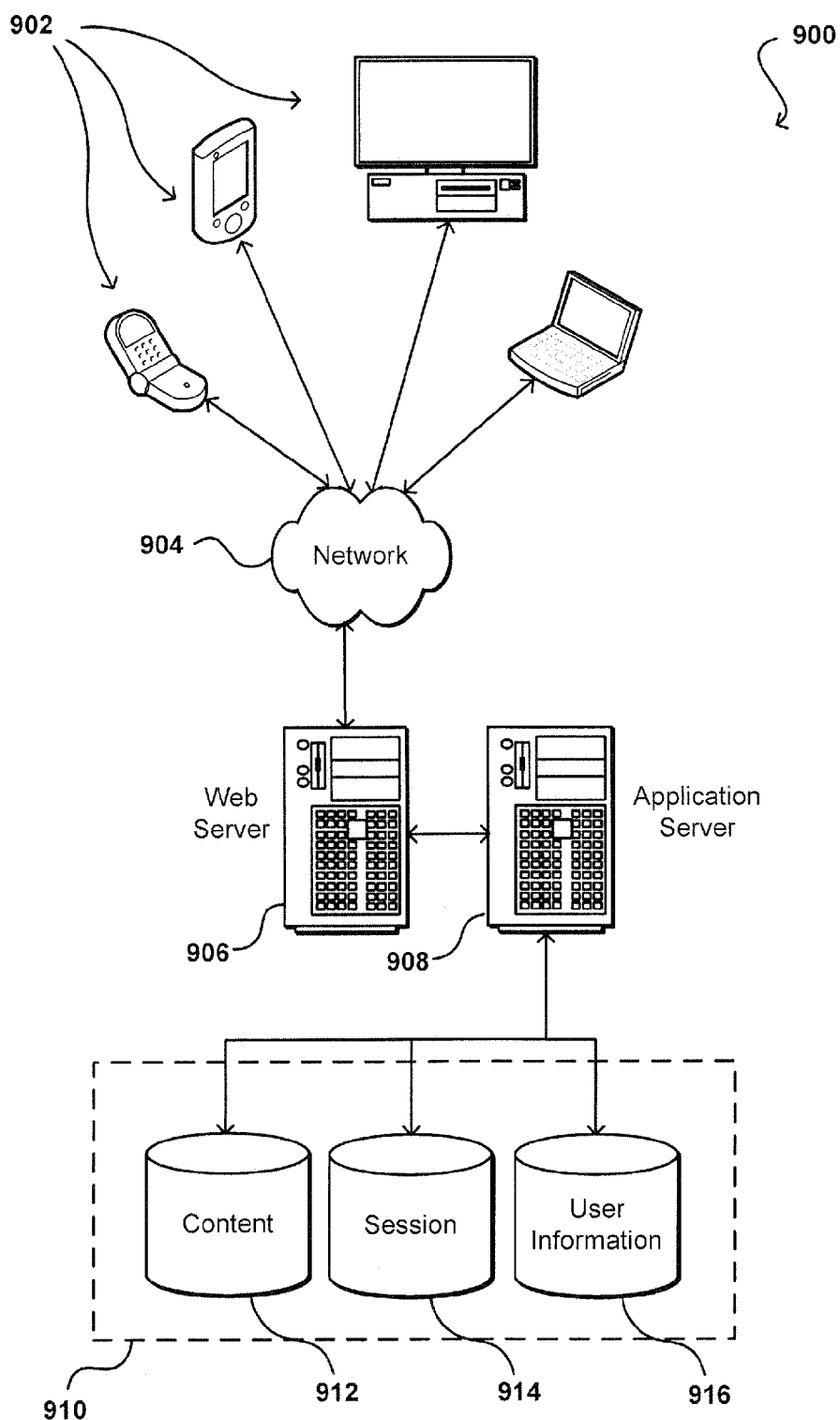
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java® C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method implemented by a computing device comprising at least one processor, the method comprising:
    obtaining context data using one or more sensors of the computing device, the context data being associated with a current environment in which the computing device is situated;
    determining a context of the current environment in which the computing device is situated, wherein the determining is based at least in part upon the context data and includes predicting a future context;
    determining object data associated with the determined context is not stored locally on the computing device;
    downloading, from a storage device remote from the computing device, the object data associated with the determined context, the downloaded object data being stored locally on the computing device;
    receiving an identification inquiry including information about an object to be identified;
    searching the locally stored object data for a potential match for the information about the object in the identification inquiry; and
    providing a response in reply to the identification inquiry when at least one potential match is located in the locally stored object data.

2. The method of claim 1, wherein the at least one potential match is located when selected object data for at least one object in the object data stored locally on the computing device matches information in the identification inquiry within at least one determined matching criterion.

3. The method of claim 1, further comprising:
    searching for a potential match over a network if the at least one potential match is not found by searching the locally stored object data.

4. The method of claim 1, wherein the at least one potential match includes object data for at least one of an image, a video file, an audio file, or an olfactory object.

5. A method implemented by a computing device comprising at least one processor, the method comprising:
    obtaining context data using at least one device sensor of the computing device;
    determining a context based at least in part upon the context data, the context data relating to a current environment in which the computing device is situated, wherein the determining includes predicting a future context;
    determining object data associated with the determined context is not stored locally on the computing device;
    downloading, from one or more devices external to the computing device, the object data associated with the determined context, the downloaded object data being stored locally on the computing device;
    receiving information for an object to be identified;
    searching the locally stored object data for a potential match for the object; and
    providing identifying information to a user of the computing device when at least one potential match is located using the locally stored object data.

6. The method of claim 5, further comprising:
    determining a current context upon receiving information for the object to be identified, wherein the locally stored object data is searched when the current context corresponds to at least a portion of the locally stored object data.

7. The method of claim 5, further comprising:
    searching object data stored on a storage device remote from the computing device when the at least one potential match is not able to be located using the locally stored object data.

8. The method of claim 5, wherein the object data associated with the context includes data for one or more objects associated with the current environment in which the computing device is situated.

9. The method of claim 5, wherein the at least one device sensor includes at least one of a camera, a microphone, a light sensor, an olfactory sensor, a biometric sensor, a location sensor, an orientation sensor, or a climate sensor.

10. The method of claim 5, wherein the at least one potential match includes object data for at least one of an image, a video file, an audio file, or an olfactory object.

11. The method of claim 10, wherein the at least one potential match includes at least one speech file.

12. A computing device, comprising:
    a processor;
    at least one device sensor; and
    a memory device including instructions that, when executed by the processor, cause the computing device to:
    obtain context data using the at least one device sensor;
    determine a context based at least in part upon context data obtained by the computing device, the context data relating to a current environment in which the computing device is situated, wherein the determining includes predicting a future context;
    determine object data associated with the determined context is not stored locally on the computing device;
    download, from one or more devices external to the computing device, the object data associated with the determined context, the downloaded object data being stored locally on the computing device;
    receive information for an object to be identified;
    search the locally stored object data for a potential match for the object; and
    provide identifying information to a user of the computing device when at least one potential match is located using the locally stored object data.

13. A system, comprising:
at least one processor; and
a memory device including instructions that, when executed by the at least one processor, cause the system to:
receive context data from a client computing device, the context data acquired using at least one sensor of the client computing device;
attempt to determine a context associated with the context data, wherein the context data is related to a current environment in which the client computing device is situated, wherein determining the context includes predicting a future context;
determine object data for the determined context and send the object data to be downloaded and stored locally on the client computing device, the object data useful in matching objects identified to the client computing device;
receive over a network a request to identify an object when a potential match is unable to be located using the locally stored object data on the client computing device;
locate a potential match among object data stored on the system; and
transmit information for the potential match to the client computing device.

14. The system of claim 13, wherein the instructions cause the system to attempt to update one or more sets of object data stored locally on the client computing device when new object data is available.

15. A non-transitory computer-readable storage medium including instructions, the instructions when executed by a processor of a computing device causing the computing device to:
obtain context data using one or more sensors of the computing device;
determine a context based at least in part upon context data obtained by the computing device, the context data relating to a current environment in which the computing device is situated, wherein determining the context includes predicting a future context;
determine object data associated with the determined context is not stored locally on the computing device;
download, from one or more devices external to the computing device, the object data associated with the determined context, the downloaded object data being stored locally on the computing device;
receive information for an object to be identified;
search the locally stored object data for a potential match for the object; and
provide a response to a user of the computing device when at least one potential match is located.

16. The non-transitory computer-readable storage medium of claim 15, wherein the instructions cause the computing device to search object data stored on a storage device remote from the computing device, wherein the search is for at least one potential match for the object to be identified when the at least one potential match is not located using the locally stored object data.

17. The non-transitory computer-readable storage medium of claim 15, wherein the at least one potential match includes object data for at least one of an image, a video file, an audio file, or an olfactory object.

18. The non-transitory computer-readable storage medium of claim 17, wherein the at least one potential match includes at least one speech file.

* * * * *